(12) United States Patent
Chabanne et al.

(10) Patent No.: US 6,447,066 B1
(45) Date of Patent: Sep. 10, 2002

(54) DEVICE FOR ADJUSTING A DOUBLE-JOINTED SEATBACK

(75) Inventors: Jean-Pierre Chabanne, Champvallon (FR); Jean Duchateau, Pont Salomon (FR); Eric Gagnaire, Savigneux (FR)

(73) Assignee: Grupo Antolin-Ingenieria, S.A., Burgos (ES)

( * ) Notice: Subject to any disclaimer, the term of this patent is extended or adjusted under 35 U.S.C. 154(b) by 33 days.

(21) Appl. No.: 09/610,689

(22) Filed: Jul. 7, 2000

(30) Foreign Application Priority Data

Jul. 8, 1999 (FR) .............................. 99 09132

(51) Int. Cl.[7] ................................ B60N 2/02
(52) U.S. Cl. .................. 297/367; 297/378.12
(58) Field of Search ............................ 297/367, 368, 297/366, 378.11, 378.1, 369, 378.14, 378.12, 326, 353

(56) References Cited

U.S. PATENT DOCUMENTS

| 4,243,264 A | * | 1/1981 | Bell ........................... 297/367 |
| 4,438,974 A | | 3/1984 | Kresky |
| 4,484,779 A | * | 11/1984 | Suzuki .............. 297/378.12 X |
| 4,684,174 A | * | 8/1987 | Bell ........................... 297/367 |
| 4,747,641 A | * | 5/1988 | Bell .................. 297/378.14 X |
| 5,052,748 A | | 10/1991 | Fourrey et al. |
| 5,100,202 A | | 3/1992 | Hughes |
| 5,203,608 A | | 4/1993 | Tame |
| 5,435,624 A | | 7/1995 | Bray et al. |
| 5,522,643 A | | 6/1996 | Matsuura |
| 5,590,932 A | | 1/1997 | Olivieri |
| 6,076,890 A | * | 6/2000 | Yoshida et al. ......... 297/367 X |
| 6,139,104 A | * | 10/2000 | Brewer .................... 297/367 X |

FOREIGN PATENT DOCUMENTS

JP 04 071505 A 3/1992

* cited by examiner

Primary Examiner—Peter M. Cuomo
Assistant Examiner—Stephen Vu
(74) Attorney, Agent, or Firm—Oliff & Berridge PLC (57) ABSTRACT

A device for adjusting a double-jointed seatback by a single control. A seat pan structure is joined on at least one side to a convex toothed sector centered on a first joint. A seatback structure is joined to two arms that extend on either side of a housing. The arms are articulated on a second joint mounted upon the housing, and are joined to a concave toothed sector centered on the second joint. The housing contains an upper toothed locking plate and a lower toothed locking plate. Between the two locking plates, a pivoting cam connects to a single control device. The upper toothed locking plate is joined to a stop arm that extends in the housing towards a semicircular stop located on the lower toothed sector. The semicircular stop is provided to resist the unlocking of the locking plate except when the seatback is in the maximally advanced position.

15 Claims, 11 Drawing Sheets

DEVICE FOR ADJUSTING A DOUBLE-JOINTED SEATBACK

BACKGROUND OF THE INVENTION

The invention relates to seats for transport vehicles, in particular for automobiles having a seat whose back has a first cross joint for adjusting the seatback tilt to achieve the positioning desired by the occupant.

A second joint, generally located above a first joint enables the seatback to be folded down to an essentially horizontal position, whereby it forms a tabletop. This position, which can be used to support various objects, reduces the volume of the seat when it is retracted inside the vehicle, and increases the interior volume of the vehicle when the seat is removed from the vehicle.

In most current seats, each joint is associated with its own locking means. For example, a seat having a toothed segment cooperating with toothed locking plates, provides each with its own control means. As a result, one can confuse the control means when trying to manipulate the seat to various positions. One may, for example, inadvertently unlock the second fold-down joint while trying to adjust the seatback position for comfort.

Additionally, seats equipped with seatbelt anchoring points may hurl occupants forward with no restraint, if adjustments are attempted while the vehicle is being sharply braked. This may result in injury, or worse, to an occupant.

To remedy these situations, seats with double-jointed backs have been equipped with a single control that unlocks both seatback joints and cooperates with additional means to unlock the second fold-down joint only when the seatback is in a given position, by rotating around the first comfort-adjustment joint.

Current devices of this type are cumbersome and have locking means that are subjected to additional force components, requiring that they be oversized, which increases the total weight of the seat. The large size makes it difficult to upholster the seatback, which must have local recesses for the control mechanism and means. Hence predecessor configurations make the seats and their control mechanisms more expensive, more fragile, and more difficult to install.

SUMMARY OF THE INVENTION

The goal of the invention is to overcome these drawbacks by providing a device of reduced size for adjusting a double-jointed seatback using a single control, thereby enabling the area and weight of the device to be reduced as well as reducing the reaction stresses on the locking plates.

The device according to the invention, provides a seat pan structure joined on at least one side to a convex toothed sector that is centered on a first joint. The first joint passes through the seat pan structure and pivots relative to a two-part housing extending on each side of the toothed sector. The seatback structure is joined on at least the same side as the seat pan structure to two arms that extend on either side of the housing. The arms are articulated on a second joint mounted on the housing. The seatback is also joined to a concave toothed sector centered on the second joint. The housing contains:

an upper locking plate able to mesh with the teeth of the concave toothed sector connected with the seatback; and a lower locking plate able to mesh with the teeth of the convex toothed sector connected to the seat pan.

Between these two locking plates, a double pivoting cam secured to a transverse shaft parallel to the second joint and connected to a single control means, occupies a locking position by resting its opposed supports on ramp surfaces of each of the toothed locking plates thereby locking the two joints in place. An unlocking position relieves the supports from the ramp surfaces thereby releasing the locking plates and allowing them to move away from the corresponding toothed sectors.

Because of this arrangement, the locking means of concave and the convex toothed sectors are substantially aligned with the axis of rotation of the first joint. This eliminates reaction stress components in the event of an overload, and enables the size and weight of the seat to be reduced. Moreover, the arrangement of most of the elements in the housing engage between the two arms joined to the seat pan structure, which allows the device to be smaller, and facilitates its integration into the side of the seatback. This enables upholstering to be simpler to manufacture and install for the seatback.

In one embodiment, the upper toothed locking plate is joined to a stop arm extending in the housing towards a semicircular stop provided on the lower convex toothed sector to resist the unlocking of the locking plate except when the seatback is in the maximally advanced position by rotating around the first comfort adjustment joint.

Other features and advantages will emerge from the description that follows with reference to the schematic diagrams attached showing two embodiments of the device as examples.

DETAILED DESCRIPTION OF PREFERRED EMBODIMENTS

In the drawings, A designates the seat pan structure, B designates the seatback structure, C1 is the first joint for adjusting the comfort positions of the seatback, and C2 is the second joint by which seatback structure B can be folded down into the tabletop position, essentially above the seat pan.

In the device according to the invention, seat pan structure A, laterally on one side and on its rear part, has a bracket 2 to which a toothed sector 4, made of two juxtaposed pieces of sheet metal, is attached by fastening elements 3. The toothed sector 4 has a convex toothed area 4a whose radii are centered on the geometric axis of first joint C1. Toothed sector 4 is provided with a semicircular slot 5, whose radii are centered on the geometric axis of C1 and a semicircular stop 6, whose radii are also centered on C1. More specifically, semicircular stop 6 is formed of a half-cut in one of the pieces of sheet metal of which toothed sector 4 is made such as to form a laterally extending projection.

Figure 6:
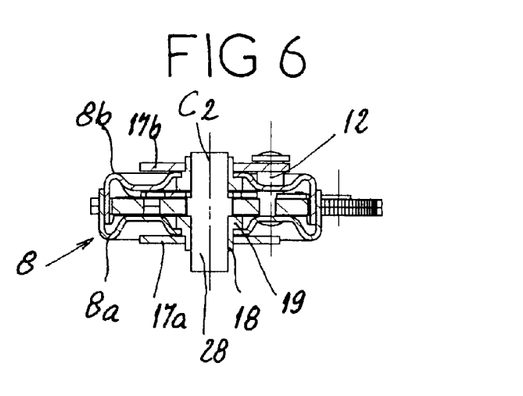
FIGS. 6, 7, and 8 are cross-sectional views along VI—VI in FIG. 1, VII—VII in FIG. 2, and VIII—VIII in FIG. 1, respectively.
Figure 7:
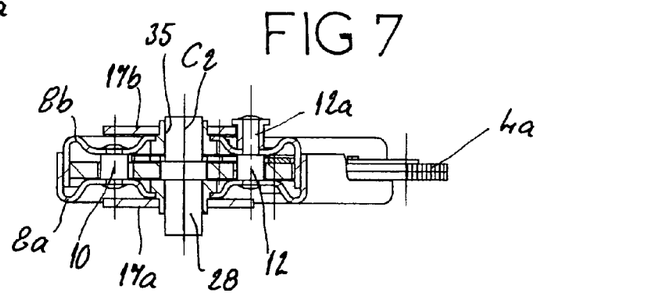

Two plates 8a, 8b of a housing 8 are articulated on shaft 28 that forms second joint C2. The two plates 8a, 8b interlock as shown in FIGS. 6 and 7 and are connected to each other by various shoulder pins, such as 9, shown in FIG. 8. Any ends of the pins extending beyond the plates are riveted together.

Figure 1:
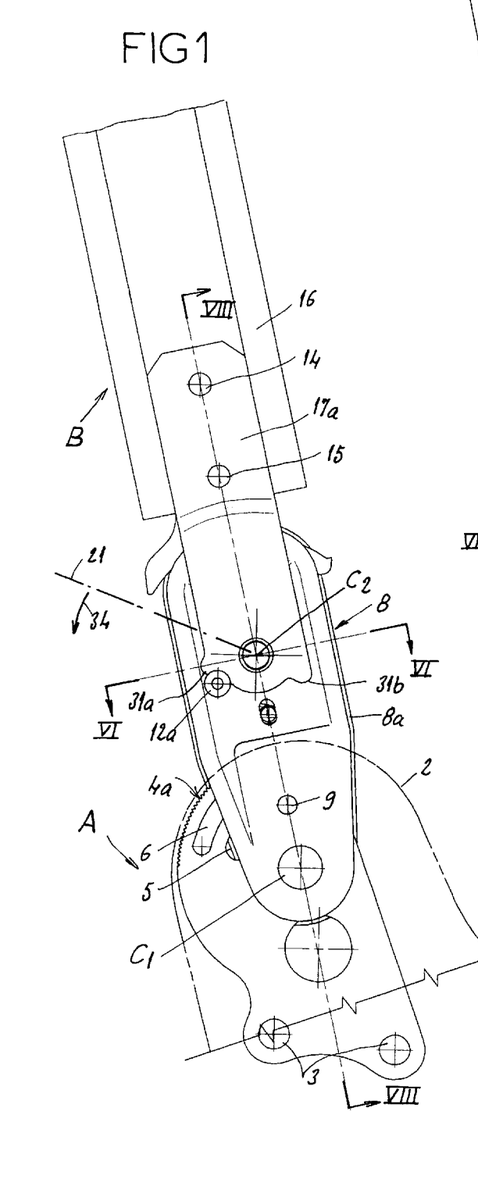
FIG. 1 is a side view in elevation of a first embodiment in the locked position.
Figure 2:
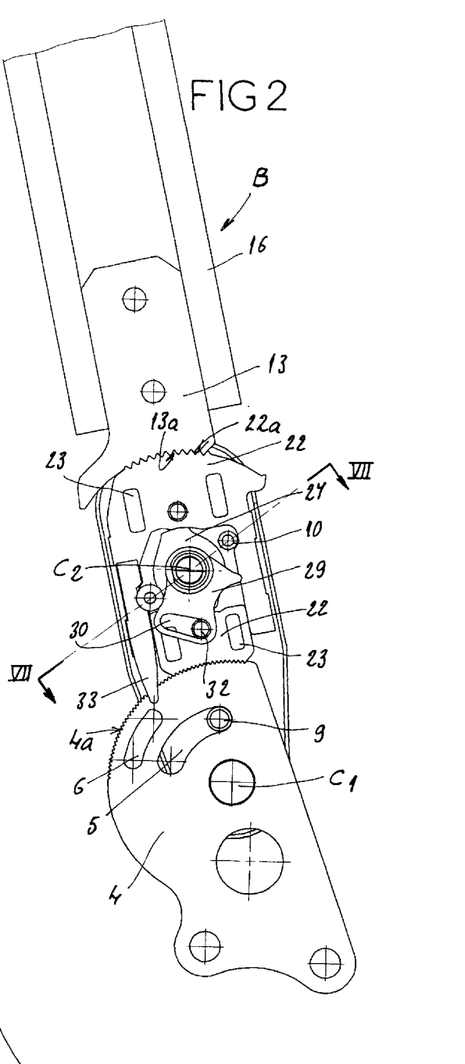
FIGS. 2 and 3 are views of the device in the locked position after removing part of the housing (FIG. 1) and after removing the pallet actuating the lower locking plate and the stop arm to reveal the center cam.

FIGS. 1 and 2 show that the central part of pin 9 can move freely in slot 5 of toothed sector 4. The ends of slot 5 form stops that limit the travel of the seatback to various comfort adjustment positions which are obtained by pivoting the seatback on first joint C1. The two plates 8a, 8b of the housing 8 are also connected by pins 10, 12 (FIGS. 2 and 3).

Figure 8:
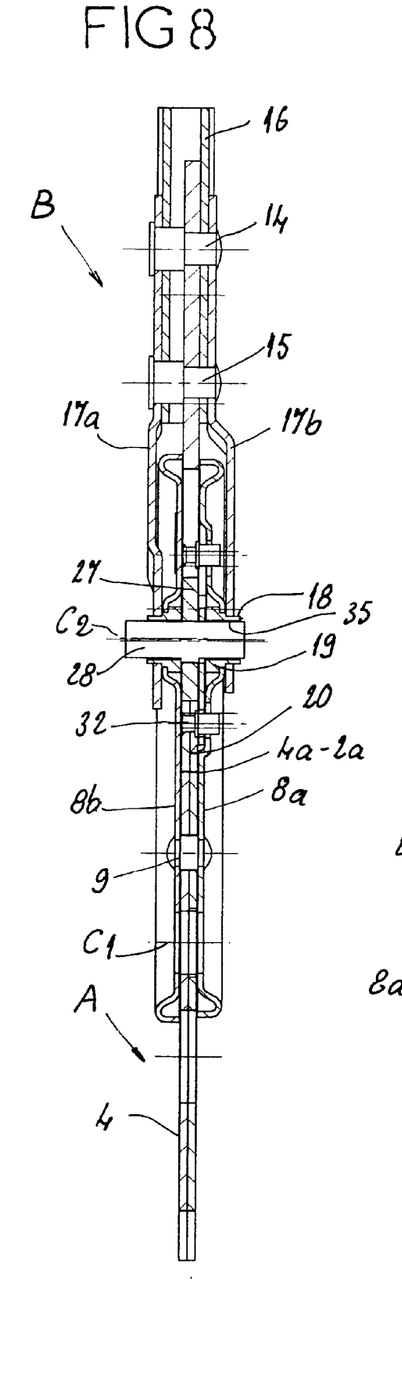

As shown in FIG. 8, the two plates 8a, 8b of the housing 8 are equally distributed on either side of the end of an upper toothed sector 13 that is rigidly connected by pins 14, 15 with riveted ends, to a beam 16 which is part of the seatback structure B. As shown in FIG. 3, toothed sector 13 has a convex toothed area 13a whose radii are centered on the geometric axis of second joint C2. Beam 16 (FIG. 8) is also connected by pins 14 and 15 to two arms 17a, 17b that extend downward to either side of the upper part of housing 8. At their lower ends, each of these arms 17a, 17b has a bearing enabling it to pivot on cylindrical support 18 of a sleeve 19, the sleeve 19 being disposed in an appropriate bearing of plates 8a, 8b corresponding to the housing 8. Support 18 thus constitutes second joint C2.

Figure 3:
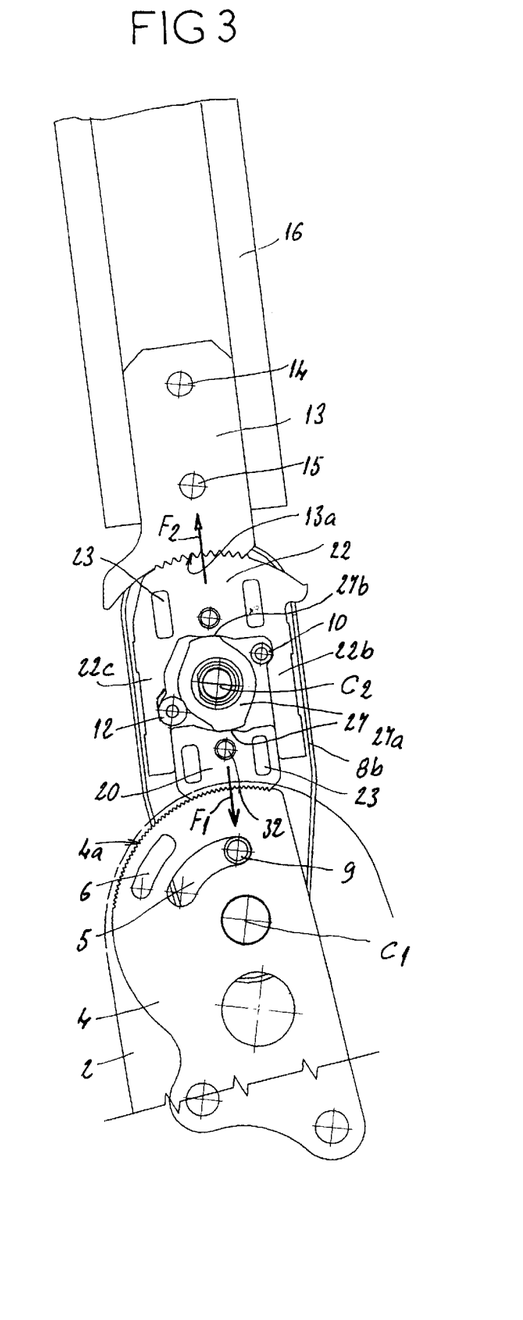
Figure 4:
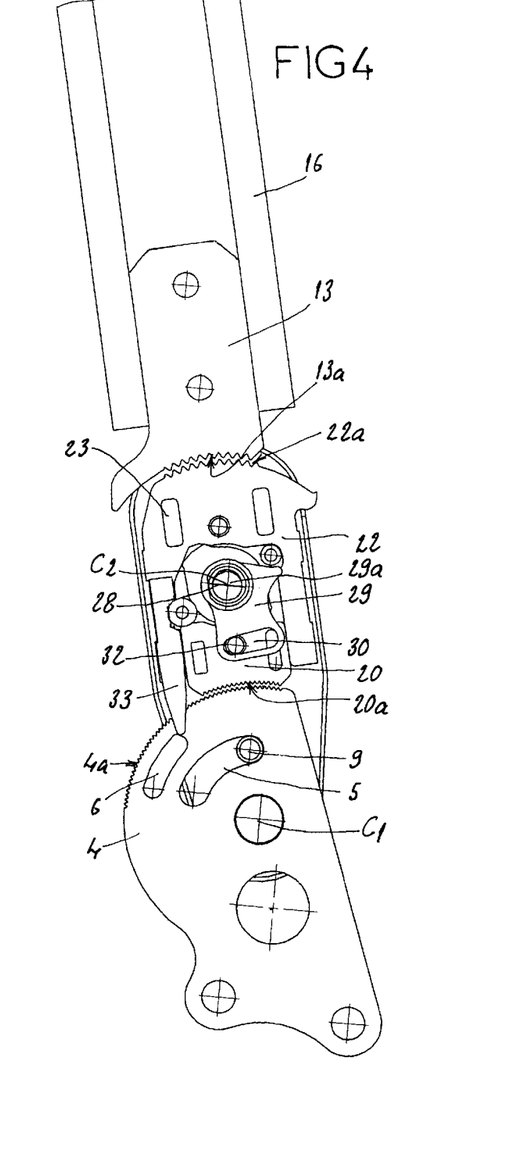
FIG. 4 is a view similar to that of FIG. 2, but with the cam in its unlocking control position.
Figure 5:
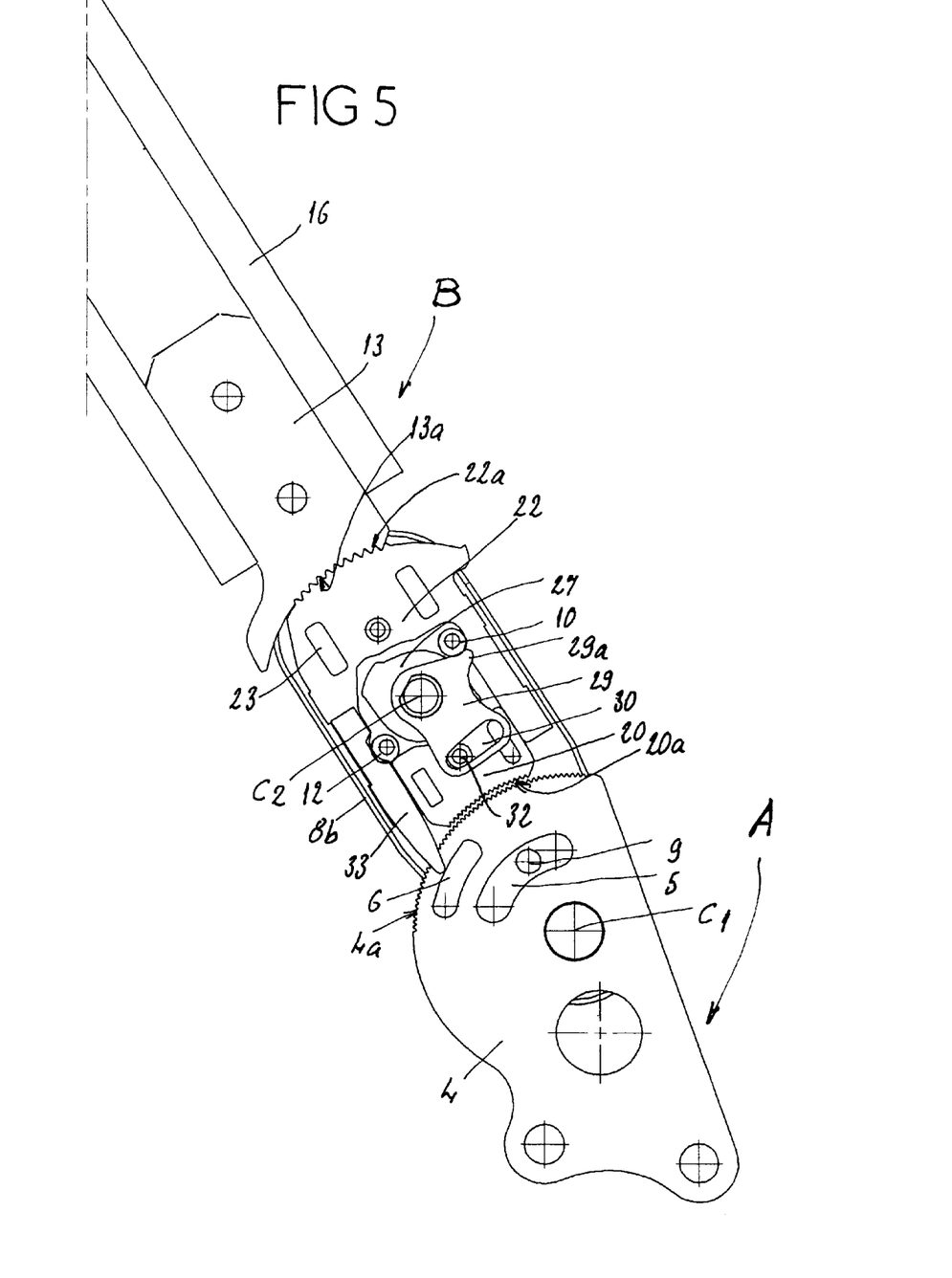
FIG. 5 is a view similar to FIG. 4 but showing the mechanism in the unlocking control position when the seatback is in an intermediate comfort position.

FIGS. 3 and 4 show that housing 8 contains a lower locking plate 20 and an upper locking plate 22. In this embodiment, the locking plates 20, 22 are both displaceable in lengthwise translation. Lower locking plate 20 has a toothed area 20a that is concave and can engage convex toothed area 4a of toothed sector 4 while upper locking plate 22 has a convex toothed area 22a that can engage concave toothed area 13a of toothed sector 13.

Figure 9:
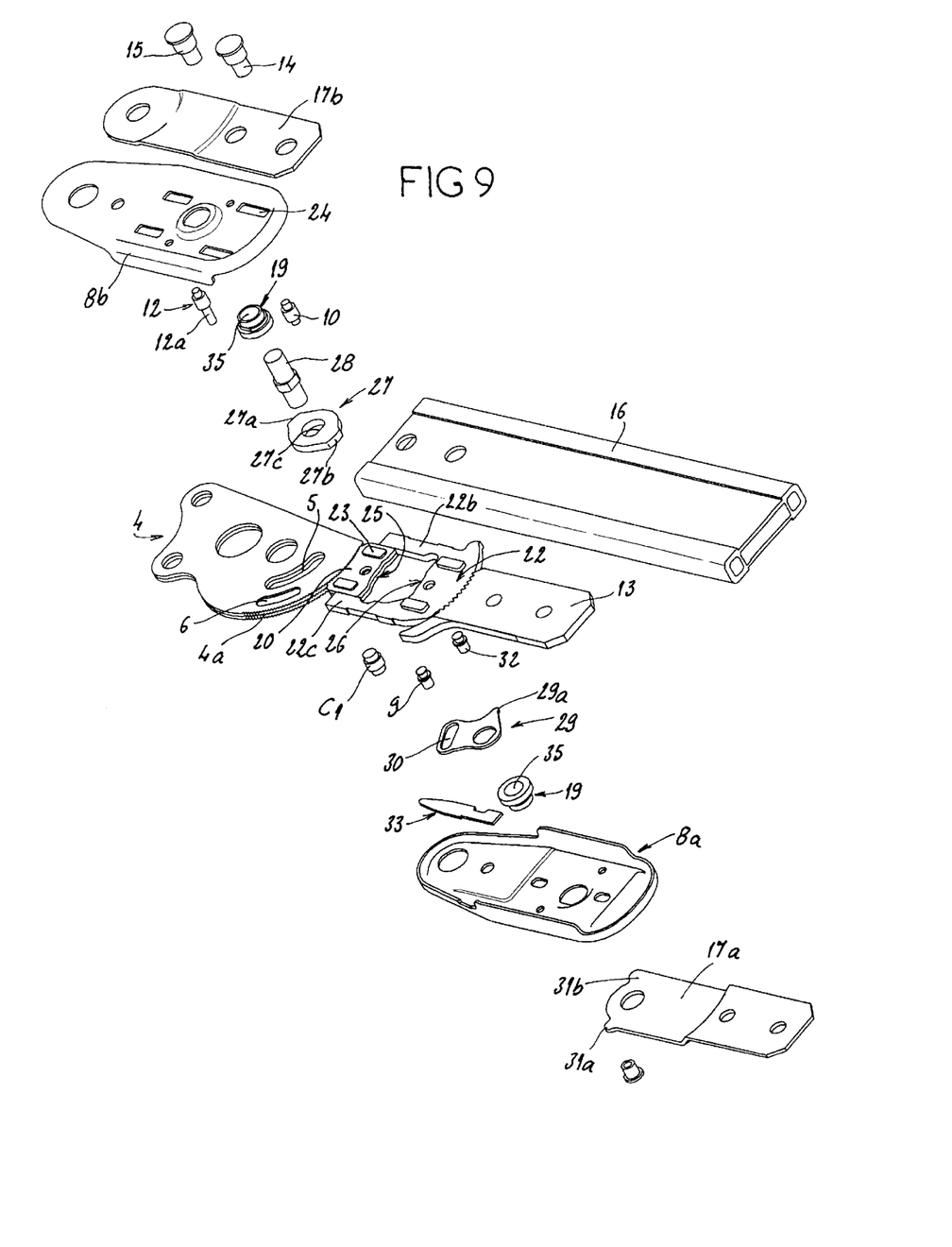
FIG. 9 is an exploded perspective view of the various components of the embodiment of FIGS. 1 to 8.

As shown in greater detail in FIG. 3, upper locking plate 22 is in the general shape of an inverted U, between the two arms 22b, 22c of which lower locking plate 20 can slide freely. To ensure that it is guided translationally lengthwise, each of the locking plates has two parallel, elongate half-cuts 23 slidably mounted in lengthwise slots 24, which can be seen in FIG. 9, made in one of plates 8a, 8b. Internally, the two locking plates have opposed ramp surfaces 25, 26 cooperating with similarly opposed supports, 27a, 27b respectively, of a double cam 27. The cam 24 is connected rotationally by a bore having a flat 27c that receives a shaft 28. The shaft 28 is free to rotate in sleeve 19 and is itself connected to a control lever 21 indicated schematically by the thick dot-dashed line in FIG. 1.

The shaft 28 is further connected rotationally to a pallet 29 (FIGS. 2, 4, 5, and 6) whose lower part is provided with a rectilinear slot 30, cooperating with a pin 32 that projects laterally from one side of lower locking plate 20. The pallet 29 is joined to a forward-projecting arm 29a and tends to abut a stop of the housing 8, in this case pin 10 which links the two plates 8a, 8b of the housing 8.

Pin 12, disposed between the two joints C1 and C2, extends outside the housing 8, to form a projection 12a constituting a stop that limits the pivoting travel of the seatback B when it converts into a tabletop by cooperating with either of two projections or knobs 31a, 31b (FIG. 1) provided at the lower end of arm 17a. These two knobs 31a, 31b each project downward and are spaced angularly as a function of the desired travel.

Figure 12:
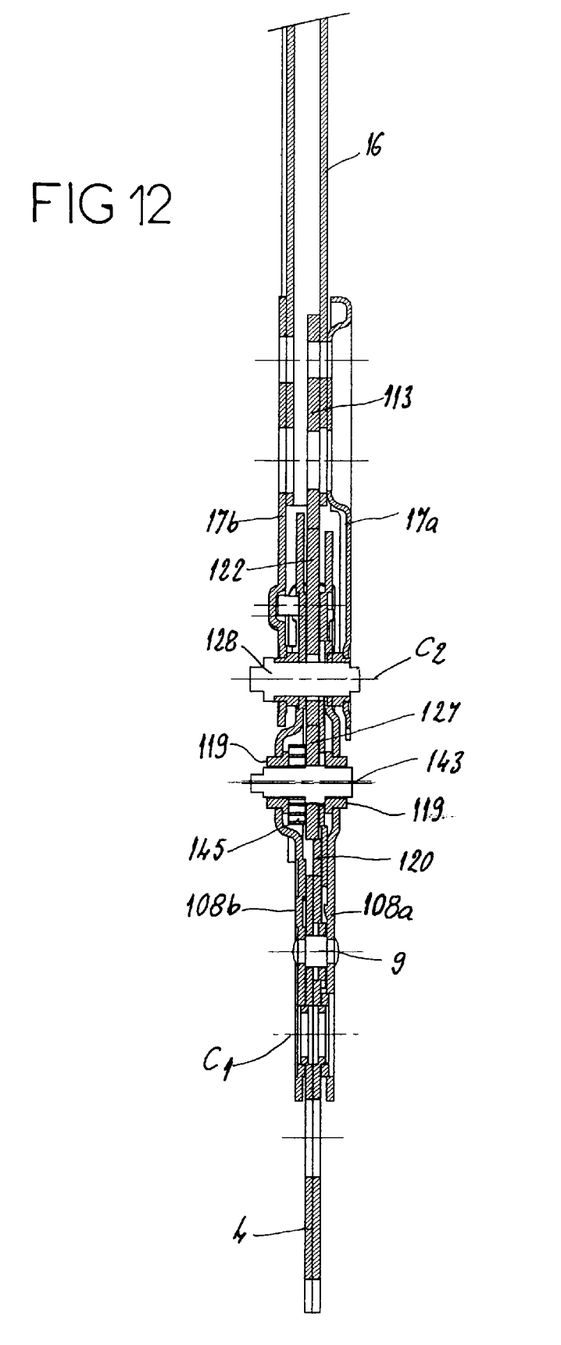
FIG. 12 is a lengthwise view along line XII—XII in FIG. 10.
Figure 13:
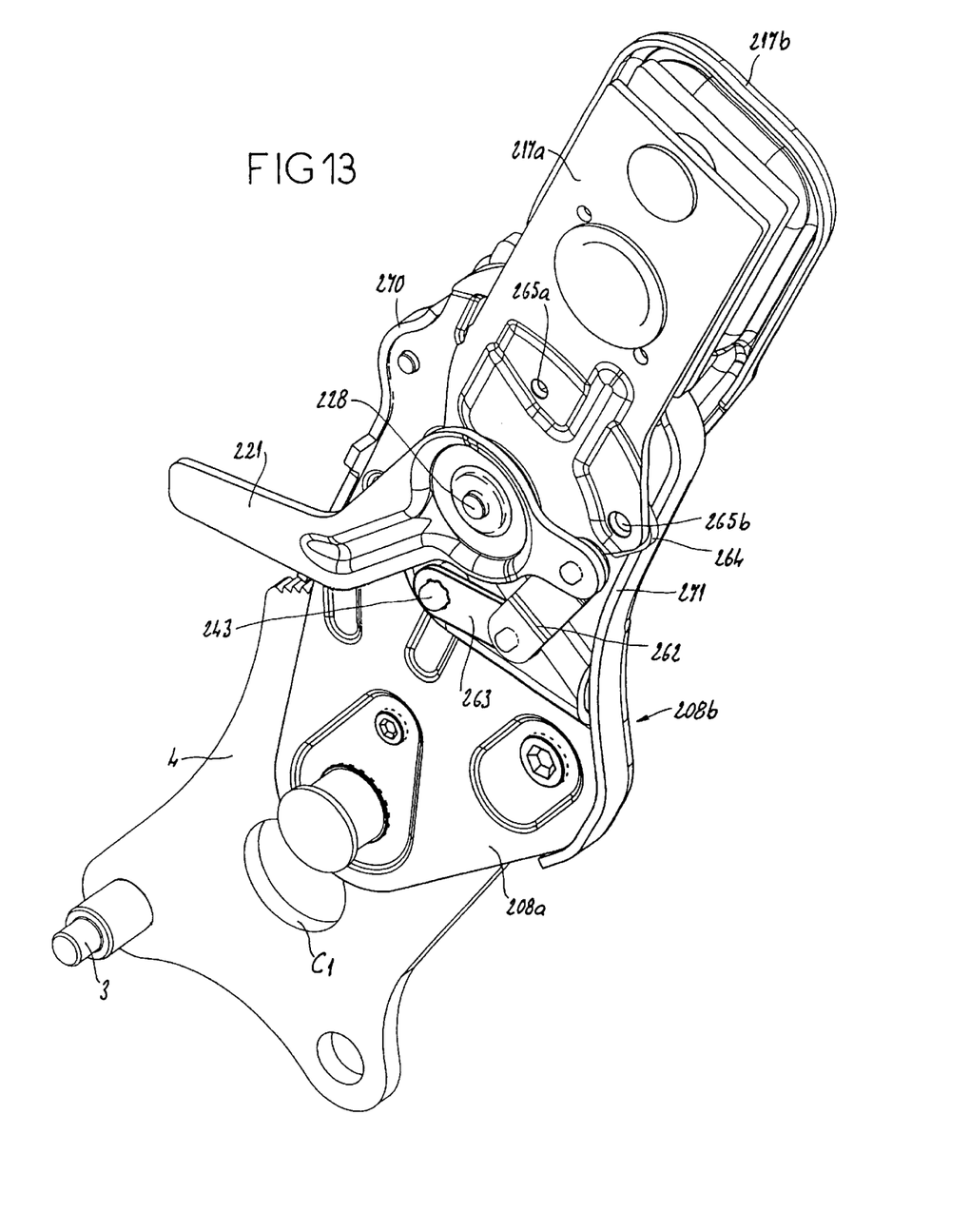
FIG. 13 is a perspective view from the outside of a third embodiment of the device.
Figure 15:
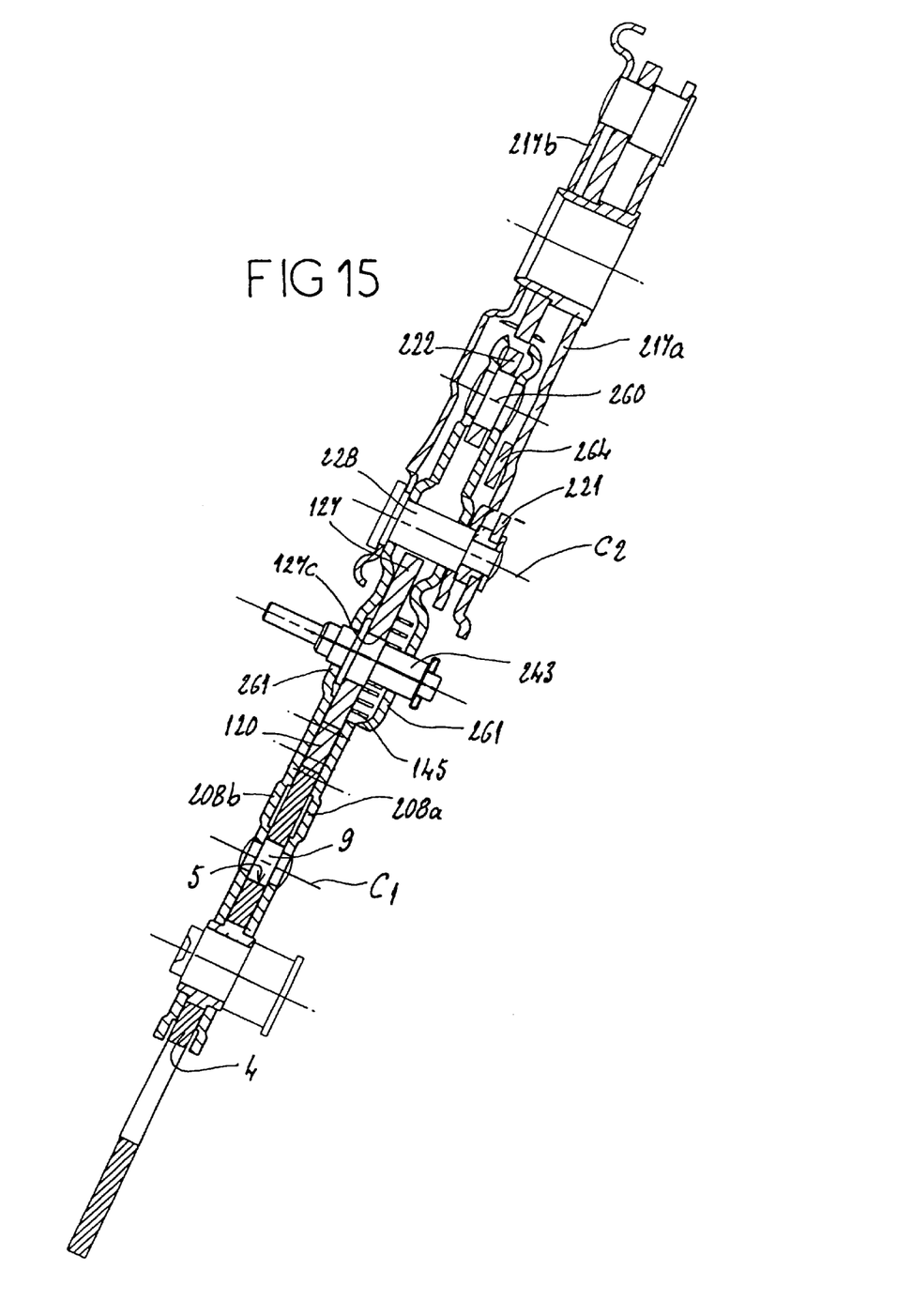
FIG. 15 is a sectional view along line XV—XV in FIG. 14.

When the seatback B is in the locked position, as shown in FIGS. 2 and 3, supports 27a, 27b of cam 27 are kept pressed against the ramp surfaces 25, 26 of locking plates 20 and 22 by a coil spring urging the cam 27, the spring not being shown in this embodiment but shown in FIGS. 12 and 15 for the other embodiments. Under this return force, the supports 27a, 27b tend to spread the locking plates 20, 22 and cause their respective toothed areas 20a, 22a to mesh with the respective toothed areas in the lower toothed sector 4 and upper toothed sector 13.

When a seat occupant operates control lever 21 connected with shaft 28 in the unlocking direction shown by arrow 34 in FIG. 1, it causes cam 27 to rotate against its return means. Thus, supports 27a, 27b cease to press on ramp surfaces 25, 26 of the locking plates and allow these locking plates to move in the unlocking direction by moving away from the respective upper and lower toothed sectors 13a, 20a. FIG. 4 shows that the lengthwise upward movement of lower locking plate 20 is provided by the cooperation of slot 30 and projection pin 32 while upper locking plate 22 falls by gravity until it abuts connecting pin 10 of the two plates 8a, 8b of the housing.

The falling by gravity of upper locking plate 22 is tolerated only if a stop arm 33, acting as an extension of arm 22c of locking plate 22, is not restricted from movement by semicircular stop 6 of toothed sector 4. Thus, in FIG. 4, where seatback B is in the forwardmost comfort position by pivoting on axis C1, stop arm 33 escapes semicircular stop 6 thereby releasing upper locking plate 22 and thus releasing the seatback structure, which can pivot on joint C2 into the tabletop position. On the contrary, in FIG. 5, where the same seatback B is in a comfort position that is less forward-tilted then in FIG. 4 and while upper locking plate 22 is being unlocked by cam 27, the upper locking plate 22 cannot disengage from upper toothed sector 13 because its stop arm 33 is pressing on stop 6.

It will be noted that the unlocking travel of lower locking plate 20 is limited by the fact that arm 29a of pallet 29 is pressing on pin 10 and that, to ensure proper locking and unlocking operation as well as to prevent jamming and excessive play, bores 35 (FIG. 9) provided in sleeves 19 and designed to receive shaft 28, are oblong. During installation it is thus possible to rotate sleeves 19 in housing 8 and thus adapt the amount of functional play to the requirements.

With a view to simplification, the various return means, namely the straightening of seatback structure B relative to joints C1, C2, and the recall means for the control lever 21 and cam 27, are not shown in the figures.

FIGS. 6 to 8 show that the mechanism takes up little space and forms an assembly that can easily be inserted into the extension of one of the vertical members of seatback structure B so that standard and easy-to-use upholstery can be used to cover the assembly. Moreover, inspection of FIG. 3 shows that the resulting forces F1, F2 applied to opposite locking plates 20, 22 are substantially in the plane passing through the axes of the two joints C1 and C2 and thus the parts contributing to locking do not have to support the additional forces coming from parasitic torques, compelling the parts to be oversized.

Figures 10, 11:
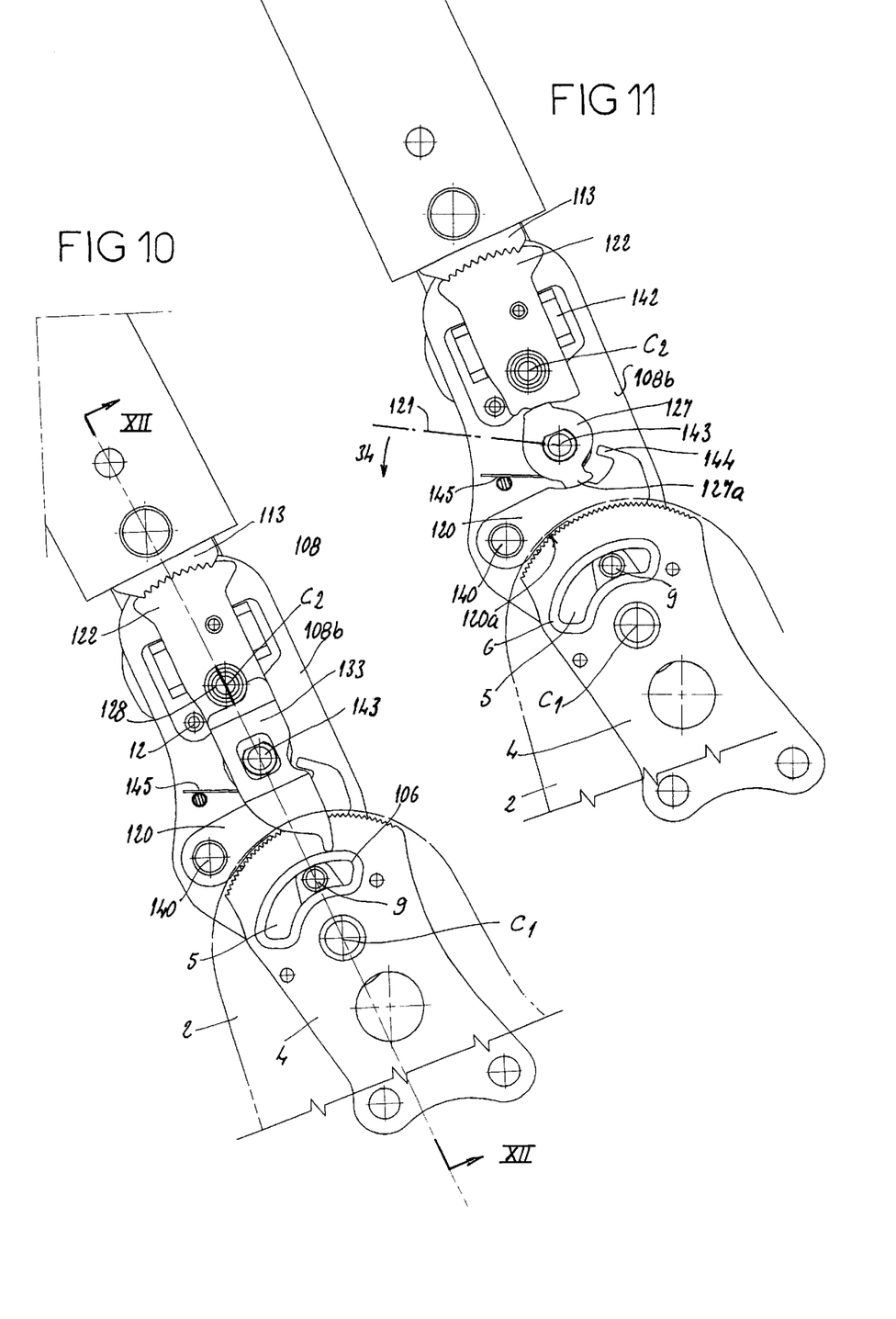
FIGS. 10 and 11 are views similar to FIGS. 2 and 3 but of a second embodiment of the invention.

FIGS. 10, 11, and 12 show another embodiment of this device. Parts identical to the first embodiment have the same reference numerals while modified parts have the same numeral plus 100. Numbers for new parts start at 140.

The device differs from the preceding device in the shape of the lower notched locking plate 120, which is no longer sliding but is instead articulated on a pin 140 borne by the two plates 108a, 108b of the housing 108. Upper notched locking plate 122 is slidably mounted between half-cuts 142 in plate 108b and is joined to a stop arm 133 cooperating with a stop 106 formed by swaging the peripheral edge of slot 5.

Finally, cam 127 is rotationally connected to a shaft 143 distinct from shaft 128 of joint C2 but parallel thereto. Shaft 143 is mounted so that it is free to rotate within housing 108 and is connected with control lever 121.

When the control lever 121 is operated in the unlocking direction, shown by arrow 34, lower support 127a of cam 127 releases locking plate 120 and comes in contact with a hook 144 of the locking plate 120 causing it to pivot and release its toothed part 120a from the teeth of toothed sector 4.

A coil spring 145 located between housing 108 and shaft 143 returns cam 127 to its locking position.

As in the previous embodiment and as shown in FIG. 12, shaft 143 of cam 127 rotates in the oblong bores of sleeves 119 disposed in the bearings of housing plates 108a, 108b to compensate for functional play.

FIGS. 13 to 16 relate to a third embodiment of the device rotated through 180° from the other figures, namely with the front of the seat facing left. Parts identical to the other two embodiments have the same reference numerals while modified elements have the same numbers plus 200, and new elements are numbered starting at 260.

This embodiment differs from the previous embodiments by the following points:

the device is not equipped with a stop arm 33 or 133 cooperating with a semicircular stop 6 or 106;

the double cam 127, rotationally secured to its shaft 243, is different from shaft 228 of joint C2, by cooperating not only with lower pivoting locking plate 120 by a hook 144 but also with an upper pivoting locking plate 222 mounted to pivot on a pin 260;

shaft 243 of the cam 127 is connected to one of the ends of a coil spring 145 whose other end rests on a pin 210 passing through housing 208. The shaft 243 rotates directly (FIG. 15) in bores 261 provided in parts 208a and 208b of the housing 208. The bores 261 are oblong in a direction substantially parallel to the lengthwise axis of the housing 208. The difference between the length of the oblong part and the diameter of the bore is approximately 0.2 to 0.4 mm;

the unlocking control lever 221 is secured to shaft 228 (FIG. 13) and connected by a link 262 to a crank 263 secured to shaft 243 of the double cam 127 to multiply on the double cam 127 the manual force applied to the control lever 221 and eliminate the slack feeling that would be caused by a lever secured to shaft 228 with a shaft 243 mounted loosely in its bearings;

the seatback B is locked into the tabletop position by an additional locking plate 264 attached by rivets 265a, 265b to the lower face of one of arms 217a, 217b of the seatback structure B, for example arm 217a. The lower, rear end of the locking plate 264 is formed as a notch 266.

Figure 16:
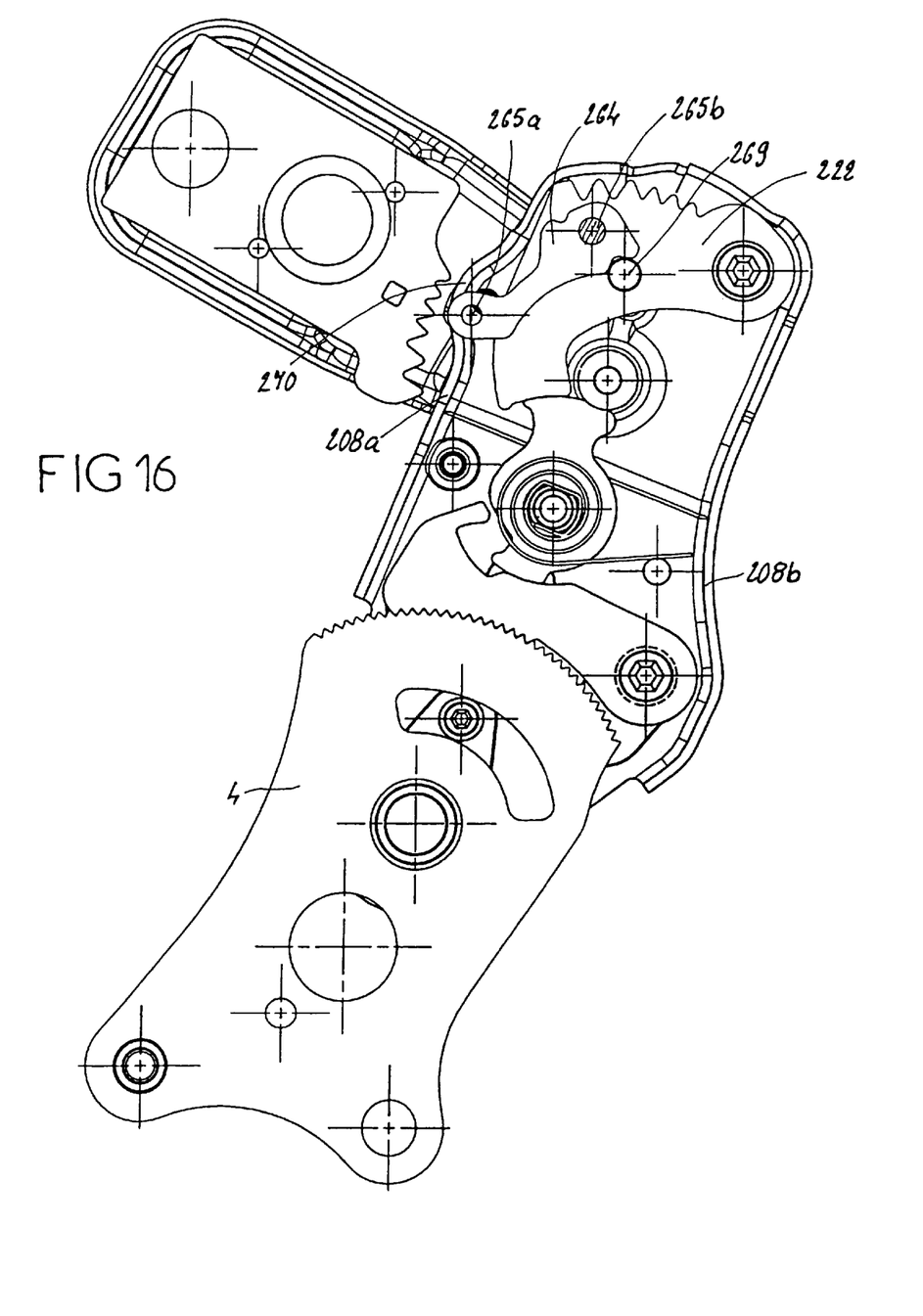
FIG. 16 is a view similar to FIG. 14, but with the seatback locked into the tabletop position

When the seatback tilts forward around joint C2 and, as shown in FIG. 16, locking plate 264 follows the movement of the seatback structure B and, at the end of tilting is stopped by one of its rivets 265a at the front turned-back edge 270 of housing 208b, in the vicinity of a pin 269 of locking plate 222. Releasing lever 221 causes cam 127 to return and spreads locking plates 220, 222 with the result that pin 269 engages notch 266.

To unlock the tabletop position, lever 221 must be operated. The lever 221 releases locking plate 222 which pivots downward by gravity, releases notch 266, and allows the seatback B to tilt backward.

Figure 14:
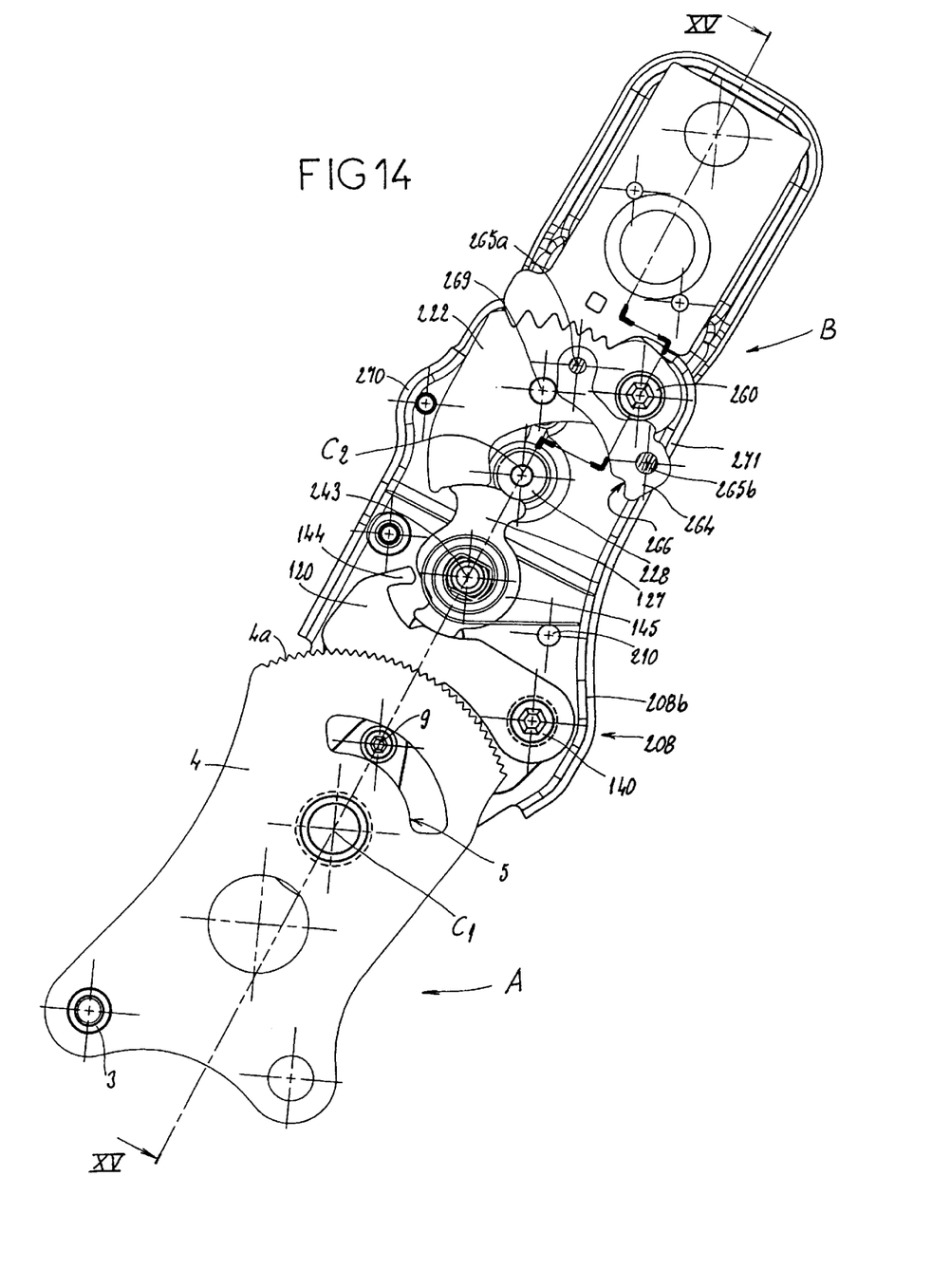
FIG. 14 is a side view in elevation of the device of FIG. 13 after removing part of the seat pan housing and the outer arm of the seatback structure.

When the seatback B is upright, as shown in FIG. 14, rivet 265b contacts rear turned-back edge 271 of housing 208b and limits the degree of the straightening. As before, comfort is adjusted by pivoting the seatback structure B on joint C1 when lever 221 has been opened so that pivoting locking plates 220 and 222 are released.

What is claimed is:

1. An adjusting device for a double-jointed seatback using a single control, comprising:

a seatback connected to a seat pan by a first joint for adjusting the seatback to various comfort positions;

a second joint for folding the seatback down over the seat pan;

a housing containing an upper locking plate having a toothed area to mesh with teeth of a first toothed sector connected with the seatback, and a lower locking plate having a toothed area to mesh with teeth of a second toothed sector connected to the seat pan;

a double pivoting cam situated between the locking plates of the housing, secured to a transverse shaft parallel to the second joint, and connected to a single control means, the cam having supports for engaging opposed ramp surfaces of each locking plate to constitute a locking position, and the cam providing an unlocking position by urging the cam supports away from the ramp surfaces of each said locking plate enabling the locking plates to move away from the corresponding first and second toothed sectors, respectively;

locking means associated with each of the first and second joints for selectively engaging at least one of the first and second toothed sectors with the corresponding toothed area of at least one said locking plate to fix a position of the seatback; and an unlocking control means to release the at least one of the first and second toothed sectors from the corresponding toothed area of at least one said locking plate it engaged with for fixing the position of the seatback, wherein the seat pan is joined on at least one side to the second toothed sector which is centered on the first joint that passes through the housing and the seatback is joined to two arms extending on either side of the upper locking plate of the housing and is articulated on the second joint having the first toothed sector centered thereon and mounted with the housing.

2. The adjusting device according to claim 1, further comprising a stop arm joined to and extending from the upper locking plate into the housing towards a semicircular stop provided on the second toothed sector, wherein the stop arm resists the unlocking of the upper locking plate unless the seatback is in a maximum advanced position.

3. The adjusting device according to claim 2, wherein the semicircular stop of the second toothed sector is a half-cut projecting from one side of the second toothed sector in a vertical trajectory of the stop arm of the upper locking plate.

4. The adjusting device according to claim 1, further comprising the upper locking plate in a general shape of an inverted U as the result of two downwardly extending arms therefrom and between the arms the lower locking plate is slidably mounted, each of the upper and lower locking plates being lengthwise movable and guided by at least two elongate, parallel half-cuts provided in each of them and for cooperative moving in slots provided in either of the plates of the housing.

5. The adjusting device according to claim 1, wherein the transverse shaft connected to the cam is also linked rotationally to a pallet extending downwardly and provided with a slot, the slot cooperating with a pin projecting laterally from the lower locking plate to bring the lower locking plate into the unlocking position.

6. The adjusting device according to claim 1, further comprising an upper locking plate slidably mounted between two half-cuts in the housing, wherein the lower locking plate is articulated on a pin and has a hook abutted by a lower part of the cam in the unlocking position.

7. The adjusting device according to claim 1, wherein the locking plates of the housing are connected by pins, one said pin of which moves relatively in a semicircular slot in the second toothed sector, the slot having radii centered on the axis of the first joint and having ends that form a stop limiting the adjustment of the seatback.

8. The adjusting device according to claim 1, wherein at least one of the pins connecting the two locking plates of the housing is located between the two joints and projects out of the housing forming a stop to limit the pivoting travel of the seatback around the second joint by cooperating with two angularly spaced knobs extending downward from the end of at least one of the arms connected to the seatback structure.

9. The adjusting device according to claim 1, wherein the transverse shaft connected to the cam that secures the locking plates is mounted freely rotationally in two sleeves that are located in bearings of each said locking plate of the housing, each said sleeve being extended outwardly by a cylindrical support cooperating with at least one of the bearings of the arms joined to the seatback.

10. The adjusting device according to claim 9, further comprising a bore provided in each of the sleeves that is vertically oblong to compensate for the manufacturing tolerances of the locking means.

11. The adjusting device according to claim 1, wherein the toothed areas of each of the lower and upper locking plates, is articulated on transverse pins and respectively supported by the housing to cooperate with the corresponding cam surfaces of the pivoting double cam while said cam is rotationally connected to a transverse shaft mounted freely rotationally in bearings of the housing, and the cam is subjected to a spring return means biasing the cam to return its cam surfaces to the locking position, the cam being connected to a control lever otherwise to bring the cam into the unlocking position.

12. The adjusting device according to claim 11, wherein one of the arms of the upper locking plate of the seatback has an additional locking plate whose lower, rearmost end is provided with a notch to engage a pin on the toothed area of the upper locking plate to lock the seatback into a tabletop position until the cam is operated in its unlocking position.

13. The adjusting device according to claim 11, wherein each of the bores provided in the locking plates of the housing for receiving the ends of the shaft driving the cam are oblong in a direction substantially parallel to a lengthwise axis of the housing to compensate for a manufacturing tolerances of the locking means, and the unlocking control lever is secured to the shaft of a joint connected by a link arm to a crank secured to the shaft of the cam.

14. The adjusting device according to claim 1, wherein the first toothed sector is convexly shaped for meshing with a concavely shaped toothed area of the upper locking plate.

15. The adjusting device according to claim 14, wherein the second toothed sector is concavely shaped for meshing with a convexly shaped toothed area of the lower locking plate.

\* \* \* \* \*